United States Patent
Hagist et al.

(10) Patent No.: US 8,590,576 B2
(45) Date of Patent: Nov. 26, 2013

(54) CORRUGATED PIPE OF A FUEL LINE

(75) Inventors: Dieter Hagist, Lahnstein (DE); Helmut Nather, Bad Camberg (DE)

(73) Assignee: Continental Automotive GmbH, Hannover (DE)

( * ) Notice: Subject to any disclaimer, the term of this patent is extended or adjusted under 35 U.S.C. 154(b) by 3 days.

(21) Appl. No.: 13/190,342

(22) Filed: Jul. 25, 2011

(65) Prior Publication Data

US 2012/0192986 A1    Aug. 2, 2012

(30) Foreign Application Priority Data

Jul. 26, 2010 (DE) .......................... 10 2010 032 219

(51) Int. Cl.
*F16L 11/11*    (2006.01)
(52) U.S. Cl.
USPC ..................................... 138/121; 138/DIG. 11
(58) Field of Classification Search
USPC ................................... 138/121, 122, DIG. 11
See application file for complete search history.

(56) References Cited

U.S. PATENT DOCUMENTS

| | | | | |
|---|---|---|---|---|
| D206,236 S * | 11/1966 | Seckel | ........................ | D23/266 |
| 3,838,713 A * | 10/1974 | Tubbs | .......................... | 138/109 |
| 4,360,104 A * | 11/1982 | Lang | ............................ | 206/527 |
| 4,819,970 A * | 4/1989 | Umehara | ....................... | 285/227 |
| 4,867,269 A * | 9/1989 | Lalikos et al. | ................. | 181/207 |
| D307,174 S * | 4/1990 | Bjorkman et al. | ........... | D23/266 |
| 5,284,184 A * | 2/1994 | Noone et al. | ................... | 138/121 |
| 5,377,670 A * | 1/1995 | Smith | ....................... | 128/204.17 |
| 5,954,367 A | 9/1999 | Doll et al. | | |
| 6,051,789 A * | 4/2000 | Kato | ............................ | 174/68.3 |
| 6,478,342 B1 * | 11/2002 | Berfield | ........................ | 285/276 |
| 7,069,953 B2 * | 7/2006 | Buttner et al. | ................ | 138/121 |
| 7,562,679 B2 * | 7/2009 | Yasuda et al. | ................ | 138/121 |
| 2004/0100094 A1 * | 5/2004 | Thomas et al. | ............... | 285/226 |
| 2004/0139947 A1 | 7/2004 | Serizawa et al. | | |
| 2005/0039810 A1 * | 2/2005 | Toliver et al. | ................. | 138/121 |
| 2007/0012374 A1 * | 1/2007 | Yasuda et al. | ................ | 138/121 |
| 2008/0308170 A1 * | 12/2008 | Bock et al. | ..................... | 138/121 |
| 2009/0308479 A1 * | 12/2009 | Krauss et al. | ................ | 138/118 |

FOREIGN PATENT DOCUMENTS

| | | |
|---|---|---|
| DE | 195 32 988 | 12/1996 |
| DE | 198 26 011 | 12/1998 |
| DE | 201 13 499 | 1/2003 |
| EP | 0 297 861 A2 | 1/1989 |
| EP | 1 055 856 A2 | 11/2000 |

OTHER PUBLICATIONS

Fränkische Rohrwerke Gebr. Kirchner GmbH & Co. KG; Corrugated tubing; Wellrohre (Fluidsysteme); www.fraenkische.com; Königsberg; 2011; DE.

* cited by examiner

*Primary Examiner* — James Hook

(74) *Attorney, Agent, or Firm* — Cozen O'Connor

(57) ABSTRACT

A corrugated pipe of a fuel line of a fuel supply system of a motor vehicle, with at least one flexible wavy portion having waves, the waves in each case having a wave crest and of a wave trough. The at least one wavy portion possesses at least one first region in which the waves have a larger diameter.

7 Claims, 3 Drawing Sheets

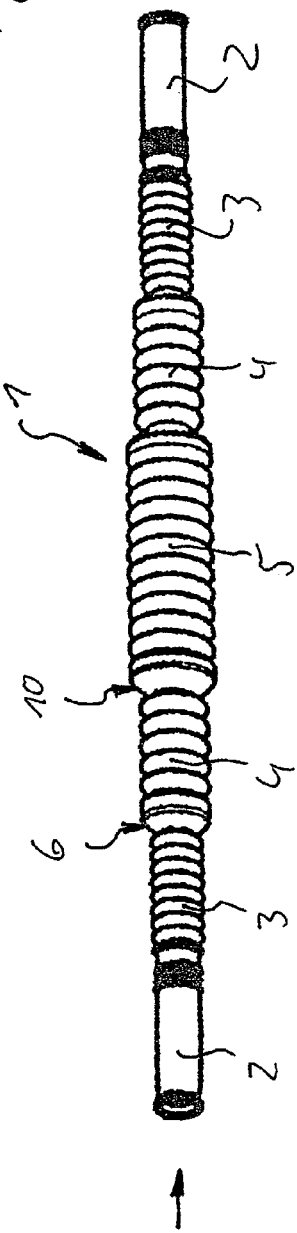
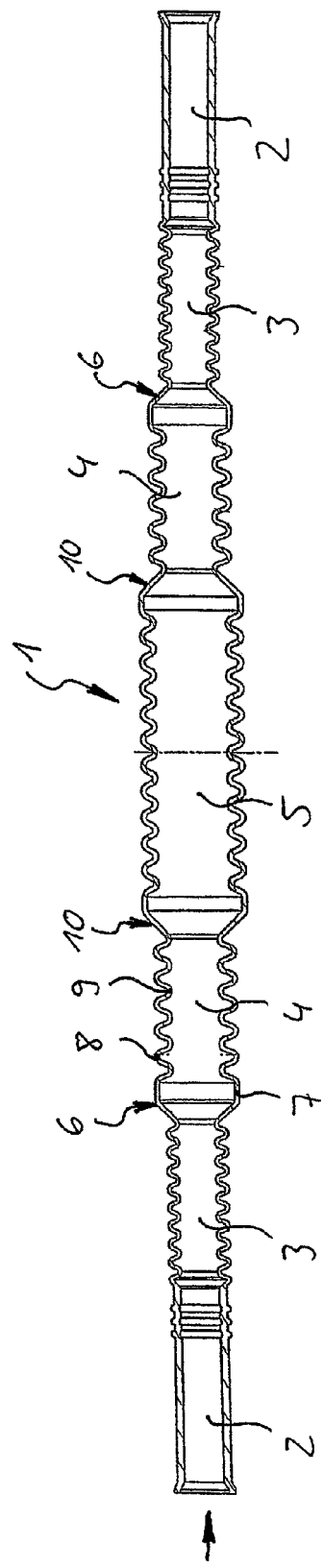

CORRUGATED PIPE OF A FUEL LINE

BACKGROUND OF THE INVENTION

1. Field of the Invention

The invention relates to a corrugated pipe of a fuel line of a fuel supply system of a motor vehicle, with at least one flexible wavy portion having waves, the waves being comprising in each case a wave crest and a wave trough.

2. Description of the Related Art

Corrugated pipes are often used in present-day fuel supply systems of present-day motor vehicles for connecting a fuel pump to a filter or to a flange of a fuel feed unit. In the known fuel supply system, the corrugated pipe is pushed with the end portion onto a connection piece of the fuel pump, said connection piece mostly having a pinetree profile. For this purpose, the end piece is configured cylindrically. The wavy portion enables the corrugated pipe, which serves for the compensation of tolerances of the fuel supply system, to have flexibility. Furthermore, depending on the filling level in the fuel tank, relative movements occur between the fuel pump and the flange and are compensated by the corrugated pipe.

A disadvantage of the known corrugated pipe is that undesirable pressure pulsations in the forward flow line leading from the fuel pump to the internal combustion engine of the motor vehicle are conducted through the corrugated pipe causing noises there. Noises in the fuel tank are fundamentally disturbing on account of its position in the motor vehicle. Moreover, pressure pulsations are disadvantageous, since, depending on magnitude and duration, they may lead to damage to components arranged downstream.

SUMMARY OF THE INVENTION

One embodiment of the invention is a corrugated pipe of the type initially mentioned, that counteracts pressure pulsations and noises generated thereby.

According to one embodiment of the invention, at least one wavy portion possesses at least one first region in which the waves have a larger diameter.

The arrangement of at least one first region gives rise in the corrugated pipe to a space of enlarged cross section in which pressure pulsations can first be propagated in the upstream part of the corrugated pipe. At the downstream end of the first region, the diameter of the corrugated pipe decreases again to the diameter of the wavy portion. This decrease in diameter to some extent prevents the further propagation of the pressure pulsations that are directed downstream. Moreover, pressure pulsations are reflected at this transitional point, thus contributing to further damping of the pressure pulsations. Thus, not only are pressure pulsations reduced, but the noises thereby occurring are also reduced.

As well as a single first region arranged in a wavy portion, a plurality of first regions may also be arranged in a wavy portion. The damping of pressure pulsations can thereby be further reinforced. In so far as the corrugated pipe has a plurality of wavy portions, one or more first regions may be arranged in one, a plurality of, or all wavy portions.

According to one embodiment, improved reduction of pressure pulsations and their further propagation and also improved noise reduction are achieved in that at least a first region with waves of larger diameter has arranged in it at least one second region with waves, the diameter of which is larger than the diameter of the waves of the first region.

The transitions of a first region to a wavy portion and of a second region to a first region can be produced especially simply if the respective ends of the first and second regions are formed in each case by a plain pipe portion of variable inside diameter. Moreover, the plain inner wall allows a good reflection for the pressure pulsations, thus contributing to the damping of these.

In a simple refinement, the at least one first region and/or the at least one second region are/is arranged symmetrically in the wavy portion with respect to the length of the corrugated pipe. As a result of the symmetrical arrangement of the region or regions, calming of the flow after each change in diameter of the waves is achieved.

In adaptation to the available construction space, it may be advantageous if the at least one first region, with respect to the length of the wavy portion, and/or the at least one second region, with respect to the length of the first region, are/is arranged asymmetrically.

An especially small construction space is required by a corrugated pipe according to one embodiment when in each case one plain pipe portion of the at least one first region and of the at least one second region are arranged so as to adjoin one another directly, while the respective other two plain pipe portions of the two regions are arranged at a distance from one another. Preferably, the two plain pipe portions lying upstream are arranged so as to adjoin one another directly. In this embodiment, the cross section is enlarged in approximately one step from the diameter of the waves of the wavy portion to the diameter of the waves in the second region. The construction space contraction thus results from the omission of the waves of that part of the first region which lies upstream. The saving of construction space may become absolutely necessary particularly when the installation conditions in a fuel feed unit or in a fuel tank would otherwise permit only a substantially longer installation path of the corrugated pipe.

The relatively large change in cross section, thereby brought about, from the diameter of the waves of the wavy portion to the diameter of the waves of the second region may cause the flow to be impaired in an undesirable way. Such turbulences can be avoided if the plain pipe portions that are arranged so as to adjoin one another directly are the plain pipe portions lying downstream. By virtue of this refinement, the enlargement of cross section takes place in steps, each enlargement of cross section being followed by a flow portion with waves in which the flow can at least partially be calmed again. If the selected change in diameter is in this case small, this likewise contributes to a smoother flow in spite of the enlargement of cross section. Moreover, the plain pipe portions lying downstream have the advantage that, on the one hand, they are a large reflection surface for damping the pressure pulsations. On the other hand, this transition constitutes a high throttle point, by which the propagation of the pressure pulsations is reduced. This effect can be further reinforced in that the plain pipe portions lying upstream possess a greater axial length than the plain pipe portions lying downstream. Consequently, an even gentler transition to the enlarged volume occurs on the upstream side, while the plain pipe portions lying downstream form an even steeper reflection surface. Depending on the flow conditions, the plain pipe portions of the individual regions may also be configured identically or differently from one another, in the latter case the degree of change in diameter in the plain pipe portions of the individual regions being different.

In a further advantageous refinement, the first and the second regions have the same number of waves. Depending on the available construction space and on the installation path of the corrugated pipe, the two regions may have different numbers of waves. For sufficient stability of the corrugated pipe, it is advantageous to make the wall thicknesses of the first and second regions identical to the wall thickness of the wavy portions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention permits numerous embodiments. To make its basic principle even clearer, some of these are illustrated in the drawing and are described below. In the drawings:

FIG. 1 is a perspective illustration of a corrugated pipe according to one embodiment of the invention;

FIG. 2 is a sectional illustration of the corrugated pipe from FIG. 1;

DETAILED DESCRIPTION OF THE PRESENTLY PREFERRED EMBODIMENTS

Figure 3:
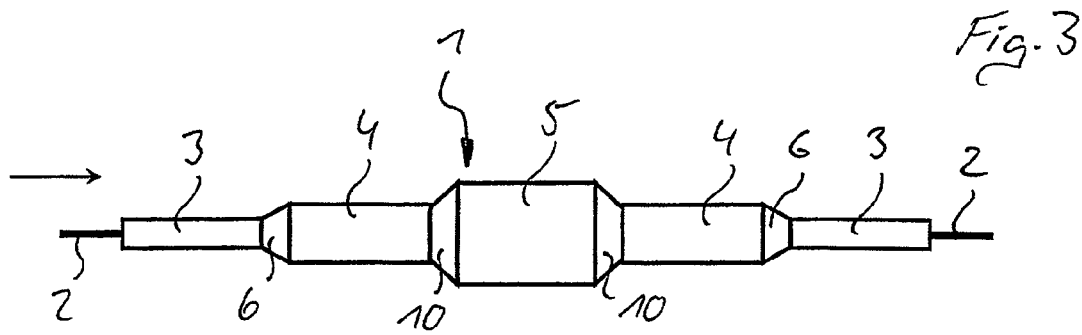
FIG. 3 is the corrugated pipe from FIG. 1.

FIG. 1 shows a corrugated pipe 1, such as is used in a fuel feed unit of a fuel tank for a motor vehicle. The corrugated pipe 1 is in this case part of the forward flow line that connects the outlet of a fuel pump to the engine of the motor vehicle. The corrugated pipe 1 possesses end pieces 2 designed as a plain pipe and are used for mounting. The corrugated pipe 1 has a wavy portion 3, which extends between the end pieces 2 over the remaining run of the corrugated pipe 1. Arranged symmetrically in the wavy portion 3 is a first region 4, the waves of which possess a larger diameter than the waves of the wavy portion 3. Arranged symmetrically in the first region 4, in turn, is a second region 5, the waves of which possess a larger diameter than the waves of the first region 4. The first and the second region 4, 5 have the same number of waves, while the wavy portion 3 possesses a larger number of waves.

For the further refinement, reference is made to FIG. 2, an arrow indicating the direction of flow of the medium. The transitions from the wavy portion 3 to the first region 4 are formed by plain pipe portions 6. The plain pipe portions 6 possess a conical form on account of the variable inside diameter, the wall thickness being constant. The plain pipe portions 6 possess a cylindrical portion 7 that allows improved transition to the waves, a wave always being formed by a wave crest 8 and a wave trough 9. The plain pipe portions 10 that delimit the second region 5 are designed identically to the plain pipe portions 6. However, it is also conceivable to configure the plain pipe portions 6, 10 of the regions 4, 5 differently from one another. It is likewise possible to configure the upstream plain pipe portion 10 of a region differently from the plain pipe portion 10 lying downstream.

During operation, the fuel conveyed by the fuel pump flows in the direction of the arrow through the corrugated pipe 1. Widening of the flow into the first region 4 takes place at the plain pipe portion 6. In the first region 4, calming of the flow takes place, before it is widened once again at the upstream plain pipe portion 10 of the second region 5. In so far as pressure pulsations occur, these are propagated in the corrugated pipe 1. These pressure pulsations are reflected a first time at the plain pipe portion 10 lying downstream. Moreover, this plain pipe portion 10 acts as a flow throttle. Pressure pulsations are thus damped. The pressure pulsations undergo further damping at the downstream plain pipe portion 6 of the first region 4, which acts in a similar way to the plain pipe portion 10.

FIG. 3 shows the corrugated pipe 1 from FIG. 1 in a diagrammatic illustration in which the end regions 2 are shown as strokes. The second region 5 with the largest diameter is arranged symmetrically between the first regions 4 and the first regions 4 are arranged symmetrically between the wavy portions 3. The transitions between the regions 4, 5 and the wavy portion 3 take place by the plain pipe portions 6, 10. Both FIG. 3 and the following figures illustrate the portions and regions in simplified form, and therefore an illustration of the waves is dispensed with.

Figure 4:
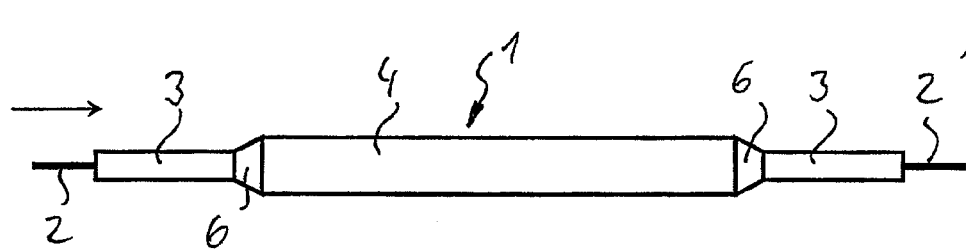
FIGS. 4-10 are further versions of the corrugated pipe according to the invention.

The corrugated pipe 1 in FIG. 4 possesses only one first region 4 arranged symmetrically in the wavy portion 3.

Figure 5:
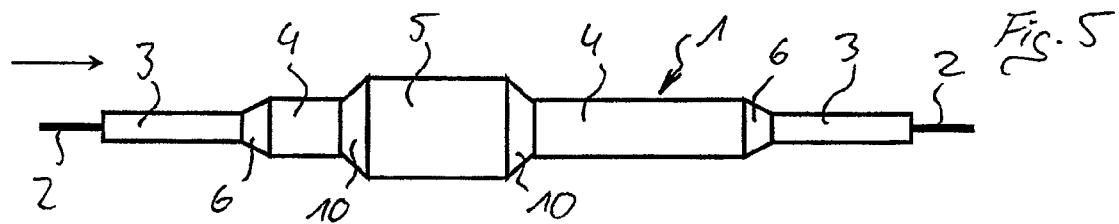

The corrugated pipe 1 according to FIG. 5 corresponds essentially to the corrugated pipe 1 from FIG. 3. The second region 5 is merely arranged asymmetrically in the first region 4'.

Figure 6:
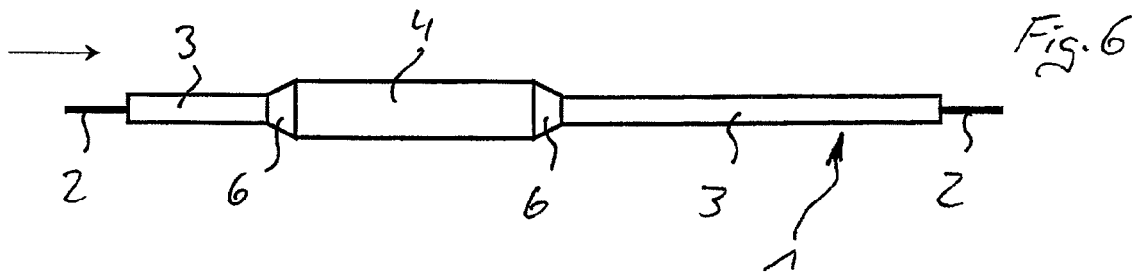

FIG. 6 shows an asymmetric arrangement of the first region 4' in a corrugated pipe 1 according to FIG. 4.

Figure 7:
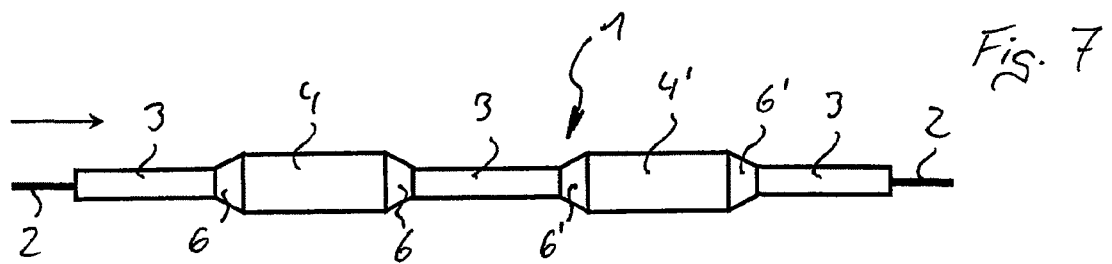

FIG. 7 illustrates a corrugated pipe 1 with a wavy portion 3 which possesses two first regions 4, 4". Instead of a second region, a further first region 4" is arranged in series with the first region 4, so that pressure pulsations are reflected at two plain pipe portions 6 lying downstream. A corrugated pipe 1 of this type requires little construction space along its radial extent.

Figure 8:
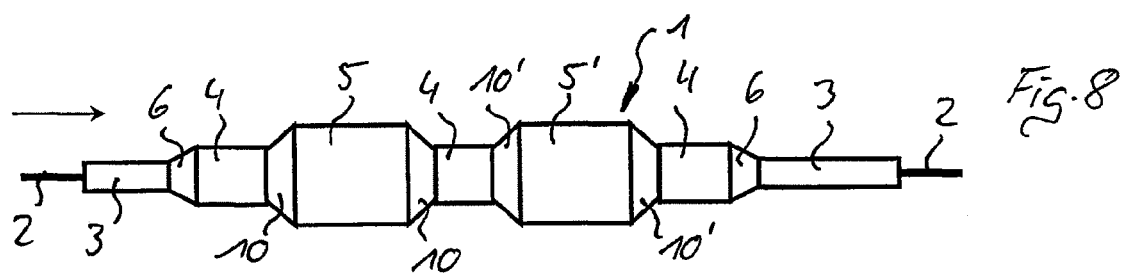

The corrugated pipe in FIG. 8 differs from the corrugated pipe 1 in FIG. 7 in that a first region 4 is arranged in the wavy portion 3 and two second regions 5, 5' are arranged in series in this first region 4.

Figure 9:
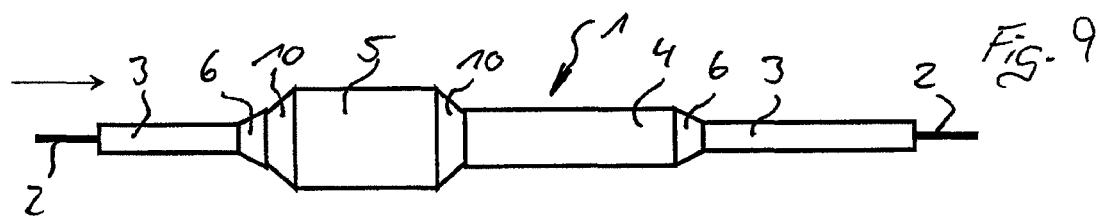

The corrugated pipe 1 in FIG. 9 comprises a first region 4 and a second region 5, the second region 5 is arranged in the first region 4 such that the upstream plain pipe portion 6 of the first region 4 is followed directly by the plain pipe portion 10 of the second region 5, without the first region 4 having a wave upstream of the second region 5. As a result of the major change in cross section, turbulences occur in the flow which in the event of pressure pulsations have a damping effect upon these.

Figure 10:
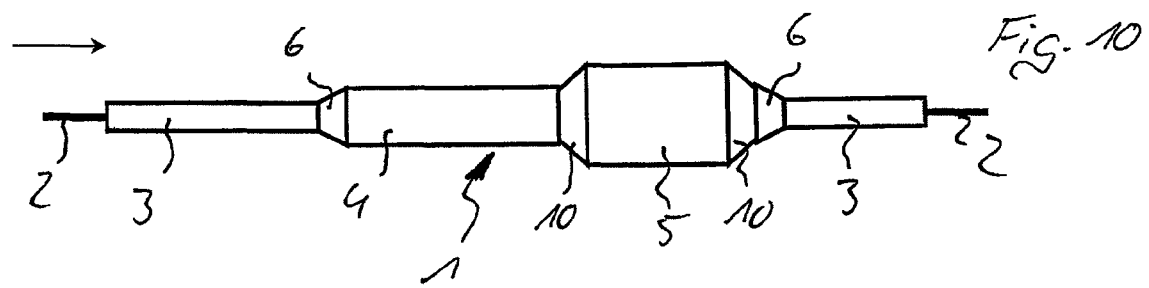

FIG. 10 shows a corrugated pipe 1 which, with respect to the direction of flow, possesses a set-up opposite to that of the corrugated pipe 1 according to FIG. 9. The plain pipe portions 10, 6 lying downstream are arranged so as to adjoin one another directly, thus giving rise to a large reflection surface on which pressure pulsations can be damped.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A corrugated pipe of a fuel line of a fuel supply system of a motor vehicle, comprising:
    at least one flexible wavy portion having a plurality of waves, each of the plural waves being a wave crest and of a wave trough the wave crest having a first outer diameter and the wave trough having a first inner diameter;
    at least one first region having first waves of a second outer diameter larger than the first outer diameter and a second inner diameter larger than the first inner diameter; and
    at least one second region with second waves of a third outer diameter larger than the second outer diameter and a third inner diameter larger than the second inner diameter,
    wherein a first one of the at least one first region and a second one of the at least one first region are disposed at respective opposite sides of the at least one second region, the first one of the at least one first region being longer than the second one of the at least one first region.

2. The corrugated pipe as claimed in claim 1, wherein the respective ends of the at least one first region and of the at least one second region are formed by a plain pipe portion of variable inside diameter.

3. The corrugated pipe as claimed in claim 2, wherein at least one of the at least one first region and the at least one second region is arranged asymmetrically with respect to at least one of a length of the wavy portion and the length of the first region.

4. The corrugated pipe as claimed in claim 2, wherein a respective plain pipe portion of the at least one first region and of at least one second region are arranged so as to adjoin one another directly, while the respective other two plain pipe portions of the two regions are arranged at a distance from one another.

5. The corrugated pipe as claimed in claim 1, wherein at least one of the first one of the at least one first region and the second one of the at least one first region has a same number of waves as the second region.

6. The corrugated pipe as claimed in claim 1, wherein the at least one first and second regions each have a different number of waves.

7. The corrugated pipe as claimed in claim 1, wherein a wall thickness of each of the at least one first and second regions is identical to a wall thickness of the wavy portions.

* * * * *